US008019822B2

(12) United States Patent
Martino et al.

(10) Patent No.: US 8,019,822 B2
(45) Date of Patent: Sep. 13, 2011

(54) PERSONALIZED STORAGE ACCOUNTS IN AN ELECTRONIC FILE DELIVERY SYSTEM

(75) Inventors: Laura Martino, Rome (IT); Emanuele Trevisi, Rome (IT)

(73) Assignee: Accenture Global Services Limited, Dublin (IE)

( * ) Notice: Subject to any disclaimer, the term of this patent is extended or adjusted under 35 U.S.C. 154(b) by 103 days.

(21) Appl. No.: 12/272,311

(22) Filed: Nov. 17, 2008

(65) Prior Publication Data

US 2010/0082760 A1    Apr. 1, 2010

(51) Int. Cl.
| G06F 15/16 | (2006.01) |
| G06F 15/167 | (2006.01) |
| G06F 3/00 | (2006.01) |
| H04M 3/00 | (2006.01) |
| H04M 5/00 | (2006.01) |

(52) U.S. Cl. .... 709/206; 709/213; 715/752; 379/265.09
(58) Field of Classification Search ................... 709/206
See application file for complete search history.

(56) References Cited

U.S. PATENT DOCUMENTS

| 6,839,741 | B1 * | 1/2005 | Tsai .............................. 709/217 |
| 7,194,516 | B2 * | 3/2007 | Giacobbe et al. ............. 709/206 |
| 7,277,716 | B2 * | 10/2007 | Helferich ...................... 455/458 |
| 7,317,697 | B2 * | 1/2008 | Lewis et al. ................... 370/312 |
| 7,376,702 | B2 * | 5/2008 | DeSalvo et al. ............... 709/206 |
| 7,409,425 | B2 * | 8/2008 | Naick et al. ................... 709/206 |
| 7,617,456 | B2 * | 11/2009 | Jaeger ............................ 715/748 |
| 7,634,502 | B2 * | 12/2009 | Colton et al. .......................... 1/1 |
| 2002/0059384 | A1 * | 5/2002 | Kaars ............................ 709/206 |
| 2003/0200268 | A1 * | 10/2003 | Morris .......................... 709/206 |
| 2005/0038863 | A1 * | 2/2005 | Onyon et al. ................. 709/207 |
| 2005/0289016 | A1 | 12/2005 | Horstmann et al. |
| 2006/0020799 | A1 | 1/2006 | Kemshall |
| 2006/0031309 | A1 * | 2/2006 | Luoffo et al. ................. 709/206 |
| 2006/0168074 | A1 * | 7/2006 | Gardner et al. ............... 709/206 |
| 2007/0005715 | A1 * | 1/2007 | LeVasseur et al. ............ 709/206 |
| 2007/0124385 | A1 * | 5/2007 | Denny et al. .................. 709/206 |
| 2008/0016160 | A1 * | 1/2008 | Walter et al. .................. 709/206 |
| 2008/0281924 | A1 * | 11/2008 | Gadwale ........................ 709/206 |
| 2010/0011416 | A1 * | 1/2010 | Wagner .............................. 726/4 |
| 2010/0057765 | A1 * | 3/2010 | Dispensa et al. .............. 707/102 |
| 2010/0306330 | A1 * | 12/2010 | Friedman et al. ............. 709/206 |

FOREIGN PATENT DOCUMENTS

WO    WO 00/51034 A    8/2000

OTHER PUBLICATIONS

Extended European Search Report for European Patent Application No. 08425643.7-2416, mailed Apr. 21, 2009.

* cited by examiner

*Primary Examiner* — Ario Etienne
*Assistant Examiner* — Blake Rubin
(74) *Attorney, Agent, or Firm* — Brinks Hofer Gilson & Lione

(57) ABSTRACT

An electronic file delivery system reduces the bandwidth an electronic mail server must dedicate to large files and decreases the storage space required for attachments in an electronic mail inbox. The system uploads the large file to the recipient's personalized storage account. The recipient receives an electronic notification of the file in their storage account. The recipient may access the file without additional burden on the electronic mail server resources.

18 Claims, 17 Drawing Sheets

FIG. 17

PERSONALIZED STORAGE ACCOUNTS IN AN ELECTRONIC FILE DELIVERY SYSTEM

BACKGROUND OF THE INVENTION

1. Technical Field

This disclosure relates to the distribution of electronic files.

2. Related Art

Electronic communication is the backbone of the corporate community and now plays a major role in every aspect of life outside of work. The modern corporate employee becomes increasingly tied to work product generated on computers and computing devices. In most cases, the electronic work product must be shared across computing networks. Yet, prior communication networks handle files in a rigid, inflexible manner.

SUMMARY

An electronic file delivery system reduces the significant consumption of network bandwidth between electronic mail servers and reduces the volume of large files burdening a recipient's electronic mail inbox. The system uploads large files to the recipient's personalized file storage account. The recipient receives an electronic notification of the file stored in their storage account. The recipient may access the file without additional resources from the electronic mail server.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system, using computer program products or a machine readable medium, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various machines.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 17 shows a sender graphical user interface where a file could not be delivered.

DETAILED DESCRIPTION OF THE PREFERRED EMBODIMENTS

Electronic mail boxes are increasingly filled with large files. Those large files, which may not be immediately necessary to the recipient, may slow the delivery of the message to the recipient and slow the display of the electronic mail (email) on the recipient's system. The large files clutter an email recipient's inbox and fill storage quotas. The large files displace potentially important emails and cause subsequent emails to bounce without being delivered. An electronic file delivery system determines whether the intended recipient subscribes to a file storage service and uploads the files or attachments to the file storage service. In the system, a messaging server sends an email, without the bulky file, notifying the intended recipient of the file stored in their personal file storage service account. The recipient may then access the file without the added burden on the email server.

Figure 1:
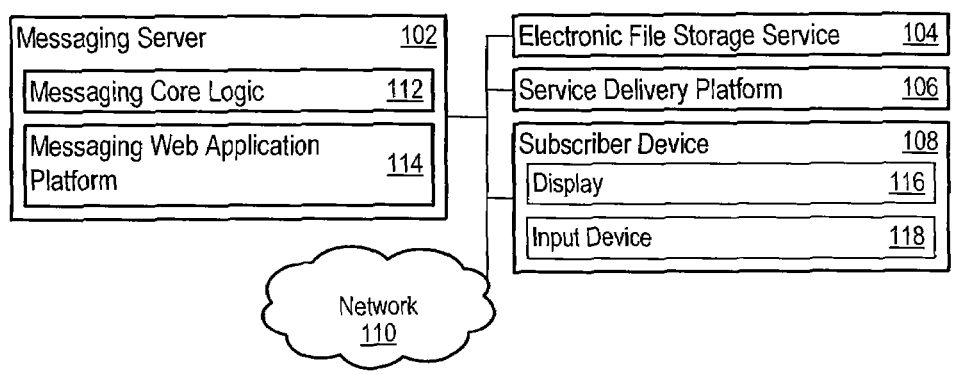
FIG. 1 shows an electronic file delivery system.

FIG. 1 shows an electronic file delivery system 100 ("system 100"). The system 100 includes a messaging server 102, an electronic file storage service 104, a service delivery platform 106, a subscriber device 108, and a network 110. The messaging server 102, the subscriber device 108, the service delivery platform 106, and the Service 104 communicate with and among each other directly or through the network 110. The messaging server 102 may receive a file from the subscriber device 108, query the service delivery platform 106, and/or upload the file to the Service 104. Messaging core logic 112 and a messaging web application platform 114 reside on the messaging server 102.

The messaging core logic 112 may communicate with the electronic file storage service 104 ("Service 104") to oversee transfer of a file into a personal storage account and/or query the service delivery platform 106 ("SDP 106") to determine whether an intended recipient has a subscription to the Service 104. The messaging web application platform 114 ("web platform 114") may communicate with the subscriber device 108 to receive files or attachments or identifiers for intended recipients.

The Service 104 stores an electronic file or attachment ("file") in an intended recipient's personal file storage account in lieu of sending the file through an email server. The Service 104 may run on a dedicated server. For example, the Service 104 may be a Web 2.0 repository, a network drive, or a digital file locker ("DFL") as disclosed in U.S. patent application Ser. No. 12/196,910 filed on Aug. 22, 2008.

The SDP 106 may be an architecture or set of components that provide a service control environment, a service creation environment, and/or a service orchestration and execution environment within a consumer or business environment. For example, the SDP 106 may provide a multi-platform communications integration service. The SDP 106 may include a component that records the services available through the SDP 106 for which a SDP subscriber has a service subscription.

The subscriber device 108 may be a device with which a subscriber may provide input and through which the subscriber may receive feedback from the electronic file delivery system 100. The subscriber device 108 may be a general computing system, such as a personal desktop or laptop computer, a tablet PC, a set-top box (STB), a personal digital assistant (PDA), a mobile device, a handheld device, a palmtop computer, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. The subscriber device 108 includes a display 116. The subscriber device 108 includes an input device 118 operable to allow a user to interact with any of the components of the subscriber device 108.

The network 110 may be a physical connection, such as a wired Ethernet connection, may be established wirelessly, or combinations thereof. The network 110 may be a public network, such as the Internet, a private network, such as an intranet, or combinations thereof, and may utilize a variety of networking protocols now available or later developed including, but not limited to TCP/IP based networking protocols. Information provided by the network 110 may be accessed through web browsers or mobile web browsers.

The network 110 may include wide area networks (WAN), such as the internet, local area networks (LAN), campus area networks, metropolitan area networks, or any other networks that may allow for data communication. The network 110 may be divided into sub-networks. The sub-networks may allow access to all of the other components connected to the network 110 in the system 100, or the sub-networks may restrict access between the components connected to the network 110. The network 110 may be regarded as a public or private network connection and may include, for example, a virtual private network or an encryption or other security mechanism employed over the public Internet, or the like.

Figure 2:
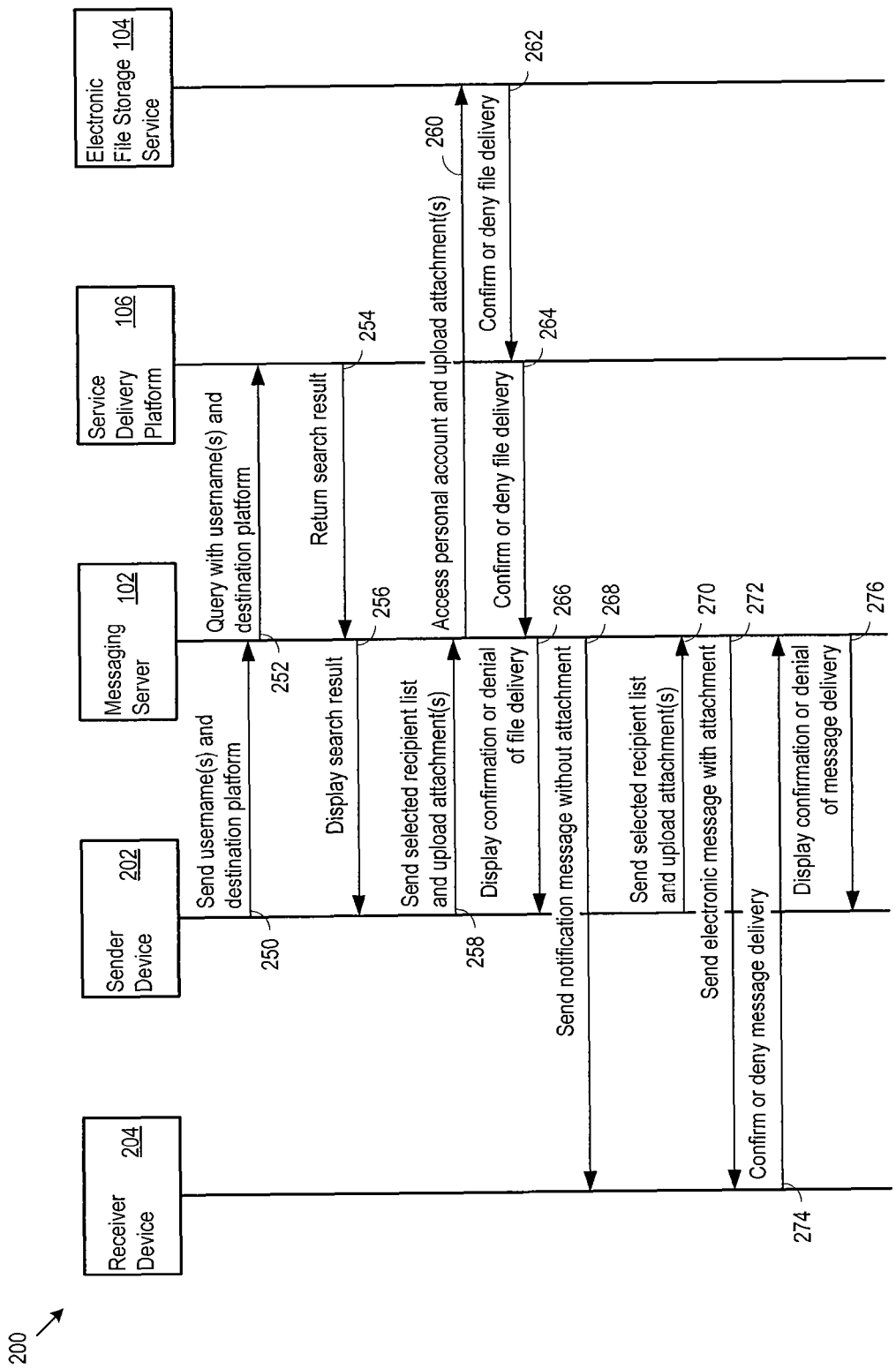
FIG. 2 shows an electronic file delivery message flow.

FIG. 2 shows a message flow 200 for an electronic file delivery. The message flow 200 may operate in an electronic file delivery system 100 including a sender device 202, the messaging server 102, the SDP 106, the Service 104, and a receiver device 204. The sender device 202 and the receiver device 204 may each be the subscriber device 108.

Figure 11:
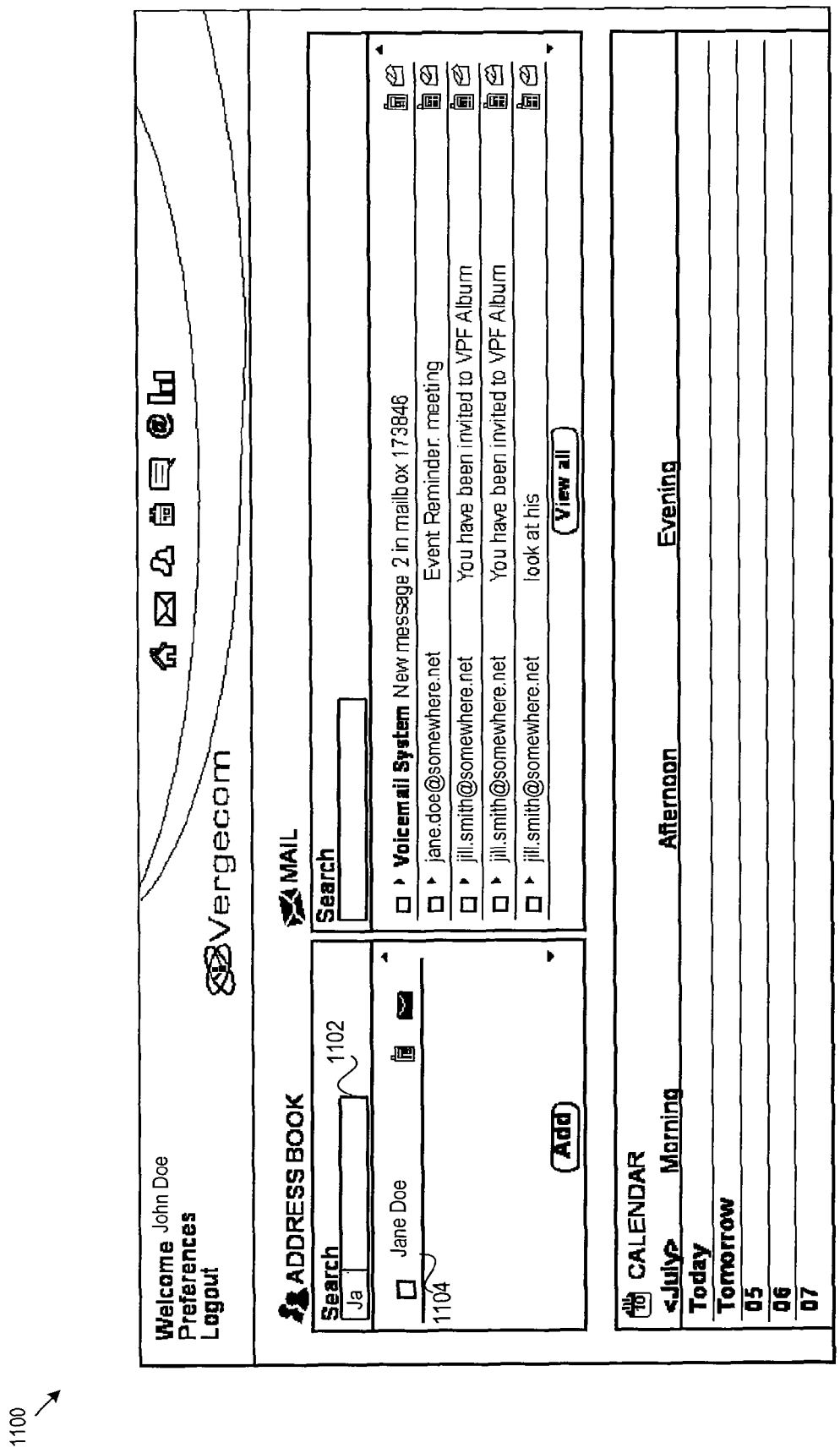
FIG. 11 shows a sender graphical user interface for an electronic file delivery system.

The sender device 202 may display a graphical user interface (GUI) to a sender. The GUI may be implemented as GUI 1100 shown in FIG. 11, although many other variations may be adopted. The GUI may accept information from the sender, such as a username, a destination platform name, and a file attachment selection. For example, GUI 1100 has a search field 1102 in which the sender may enter the name of a contact in the sender's address book. A search using the search field 1102 may produce a contact, such as the contact 1104.

Figure 12:
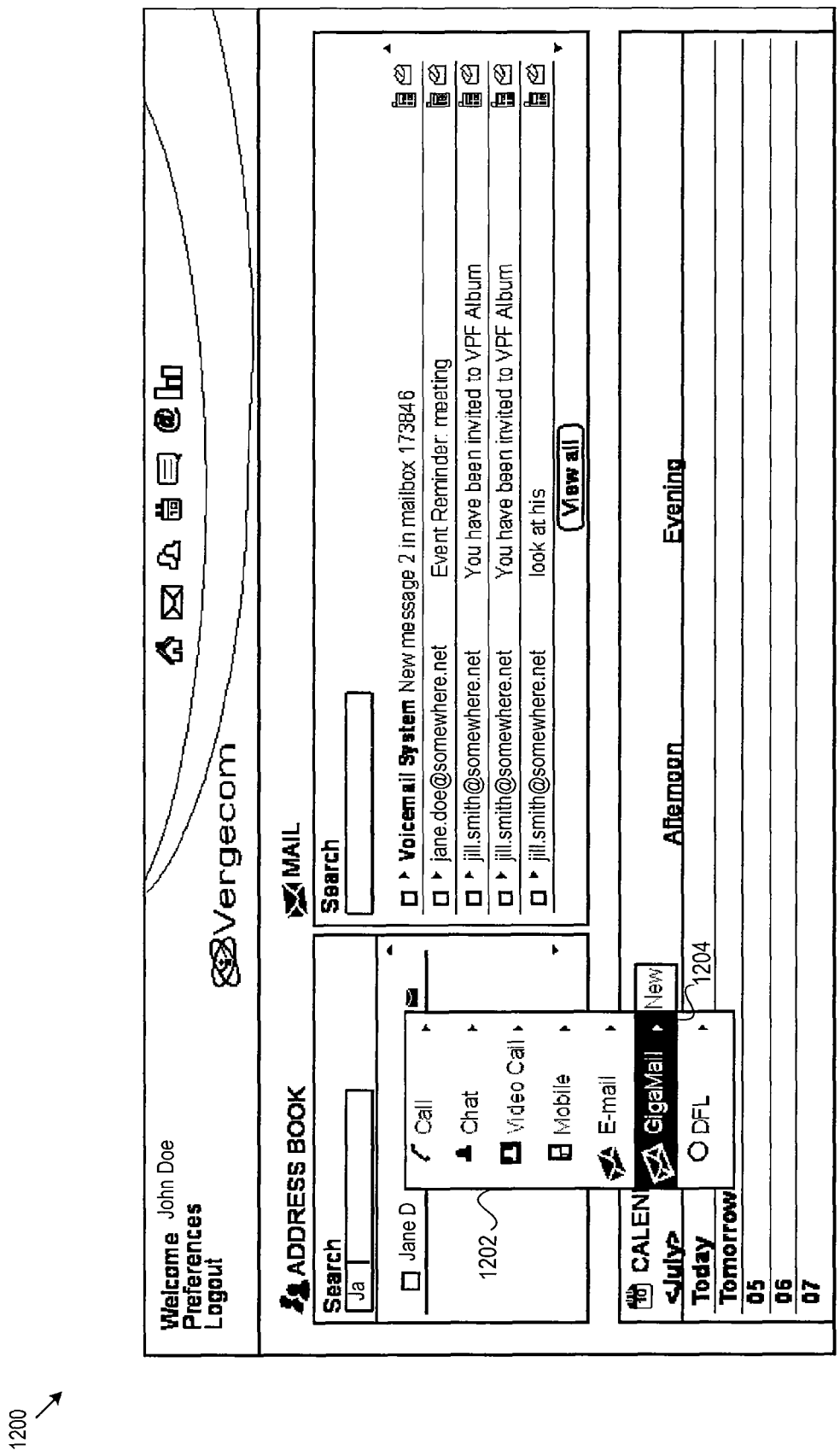
FIG. 12 shows a sender graphical user interface selecting an electronic file delivery application.

Selecting the contact 1104 may produce a drop-down menu 1202, as shown in GUI 1200 of FIG. 12, although many other variations may be adopted. Selection of the contact 1104 in this manner may determine the username as one corresponding to the contact 1104. The drop-down menu 1202 may provide options for communicating with the contact, such as by land-line telephone, internet chat, video conferencing, or other options. The drop-down menu 1202 may include an option for selecting an electronic file delivery application 1204. The selection of the electronic file delivery application 1204 may select the destination platform name. For example, selection of the electronic file delivery application 1204 may provide a default selection, such as "DFL", as the destination platform name. Alternatively, selection of the electronic file delivery application 1204 may allow the sender to choose among options for a destination platform name. A pop-up window may provide the sender with the options for a DFL, a Web 2.0 repository, or a network drive. Selection of one of those options may determine the destination platform name.

The sender device 202 communicates the username and the destination platform name to the messaging server 102 (250). The username may be a character string chosen by the intended recipient, or the username may be an email address. The destination platform name may also be a character string designated by a network administrator, or the destination platform name may be an IP address. For example, the username may be "Jane Doe" and the platform name may be "DFL".

The username and destination platform name may be transmitted through the network 110 according to TCP/IP-based networking protocols. The web platform 114 running on the messaging server 102 may initially receive the username and destination platform name, which may be further processed by messaging core logic 112. The web platform 114 may perform initial processing on the username and destination platform name, such as determining whether the information is of the correct type or format (e.g. alphanumeric, email address, internet protocol (IP) address, etc.), and may provide feedback to the sender device 202 as to the initial processing (e.g. that the type or format is incorrect). More than one username and/or destination platform name may be sent.

Messaging core logic 112 parses the username and destination platform name and sends a query to the SDP 106 with the parsed information (252). The SDP 106 processes the username and destination platform name and returns an access credential, such as a Service or digital file locker (DFL) username, when the SDP subscriber corresponding to the username has a service subscription to the destination platform. For example the access credential for the username "Jane Doe" may be "JDoe". Alternatively, the SDP 106 may return an error code or message when the username has no corresponding service subscription to the destination platform. The access credential or error message may be returned as a search result. Where multiple usernames have been submitted en masse (e.g. as a username list or username XML table), a corresponding search result may be returned en masse (e.g. as a search result list or search result XML table). The SDP 106 returns the search result to the messaging core logic 112 (254).

Figure 13:
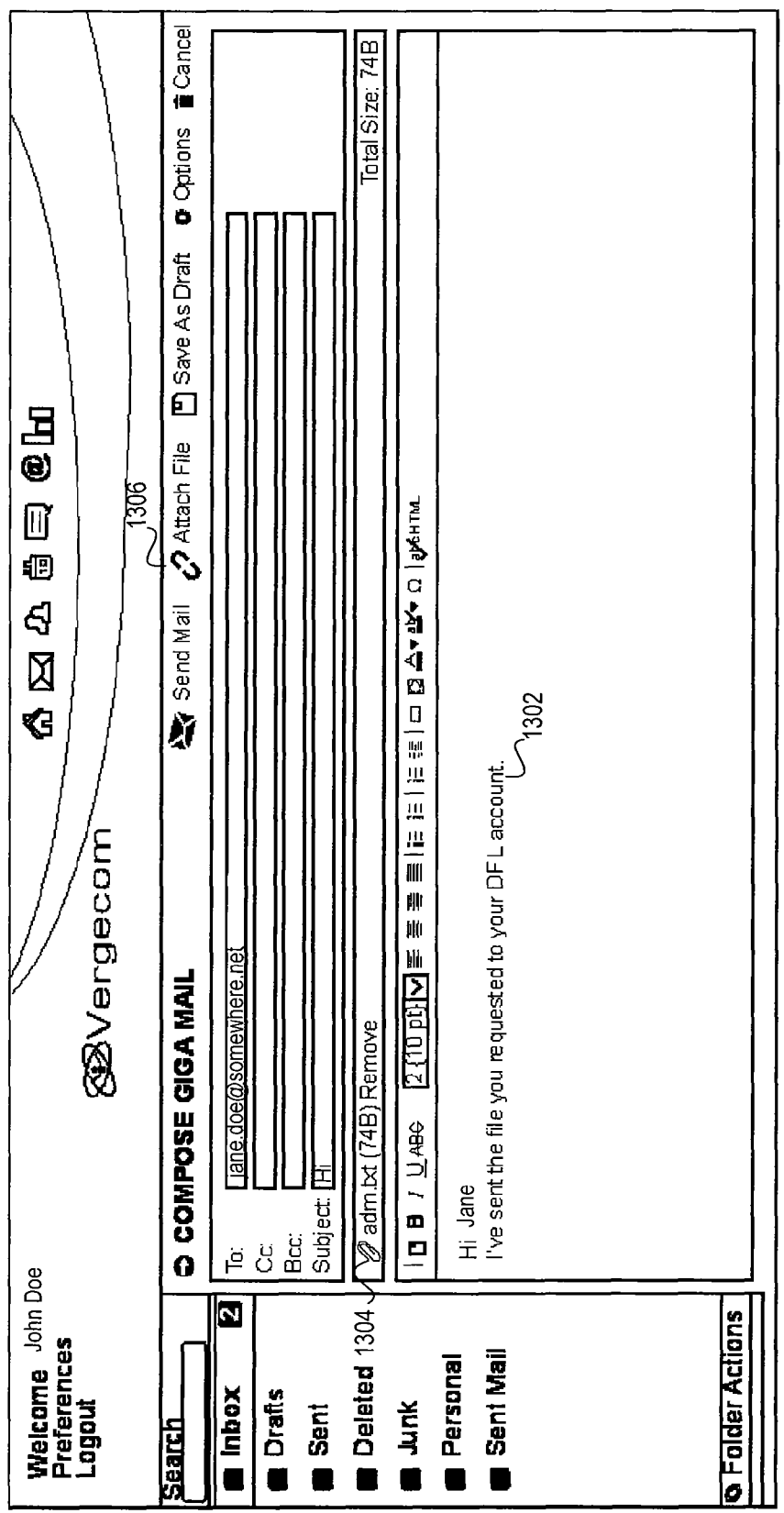
FIG. 13 shows a sender graphical user interface composing an electronic message.
Figure 14:
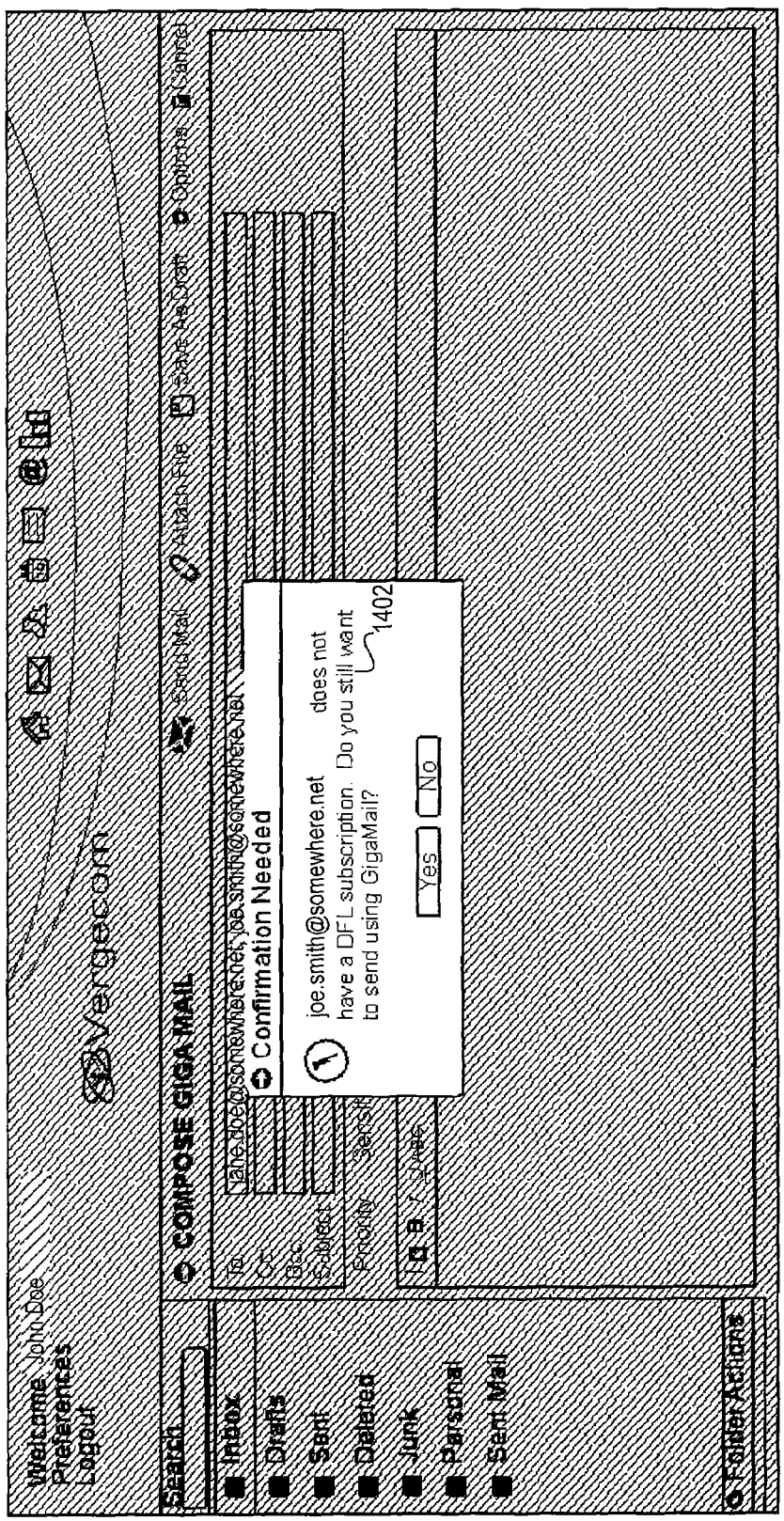
FIG. 14 shows a recipient graphical user interface.

The messaging core logic 112 may process the search result (e.g. parse, update internal records, etc.) before having the web platform 114 build a graphical user interface (GUI) around the search result data. The GUI incorporating the search result data may be sent to the sender device 202 for display (256).

Where the search result data reflects that an access credential has been received for a username, GUI 1300 in FIG. 13 may be displayed to the sender, although many other variations may be adopted. GUI 1300 indicates that the messaging core logic 112 successfully retrieved access credentials for the username "Jane Doe" by displaying an email address "jane.doe@somewhere.net" corresponding to the username in the "To:" field in an email composition page. The sender may compose a personalized message 1302 to the intended recipient and/or attach a file 1304 to the message. One method of attaching the file 1304 may be initiated by clicking on an "attach file" icon 1306.

Where the search result data reflects that an error has been received for a username or where the search result data does not contain an access credential for the username, GUI 1400 in FIG. 14 may be displayed, although many other variations may be adopted. The GUI 1400 contains a pop-up error message 1402. The error message 1402 may request the sender to confirm that they wish to continue to use the electronic file delivery application 1204. Alternatively, the error message 1402 may provide the sender with the option for another method of sending a file, such as through an email server.

The sender may select a list of intended recipients through the GUI and select one or more files as attachments to be sent to the intended recipients. The sender device 202 sends the list of intended recipients and uploads the files to the messaging server 102 (258). The messaging server 102 processes the list of intended recipients and retrieves the access credentials corresponding to each intended recipient. The messaging server 102 opens a connection to the Service 104, accesses each intended recipient's personal account, and uploads the files to each personal account (260). Each file may be sent to each account individually. Alternatively, each electronic file may be sent once to the Service 104, and the electronic file storage service manages the storage of the electronic file amongst the personal accounts.

The Service 104 determines whether each file was successfully uploaded to each personal account. The Service 104 sends to the SDP 106 a confirmation or denial corresponding to the determination (262). The confirmation or denial may be sent according to each electronic file, each intended recipient, or both. For example, the Service 104 may confirm that for one intended recipient one file was successfully uploaded and deny that a second file was successfully uploaded. For that same transaction, the Service 104 may confirm that a second intended recipient's account successfully received the second file, but failed to receive the first file.

The SDP 106 processes the confirmation or denial. For example, the SDP 106 may update SDP subscriber records. The SDP 106 may reformat the confirmation or denial and send to the messaging server 102 the reformatted confirmation or denial (264).

The messaging server builds a GUI corresponding to the confirmation or denial and sends to the sender device 202 the GUI displaying the confirmation or denial of file delivery (266). The sender device 202 may display the GUI, and the sender may take further action accordingly.

Figure 15:
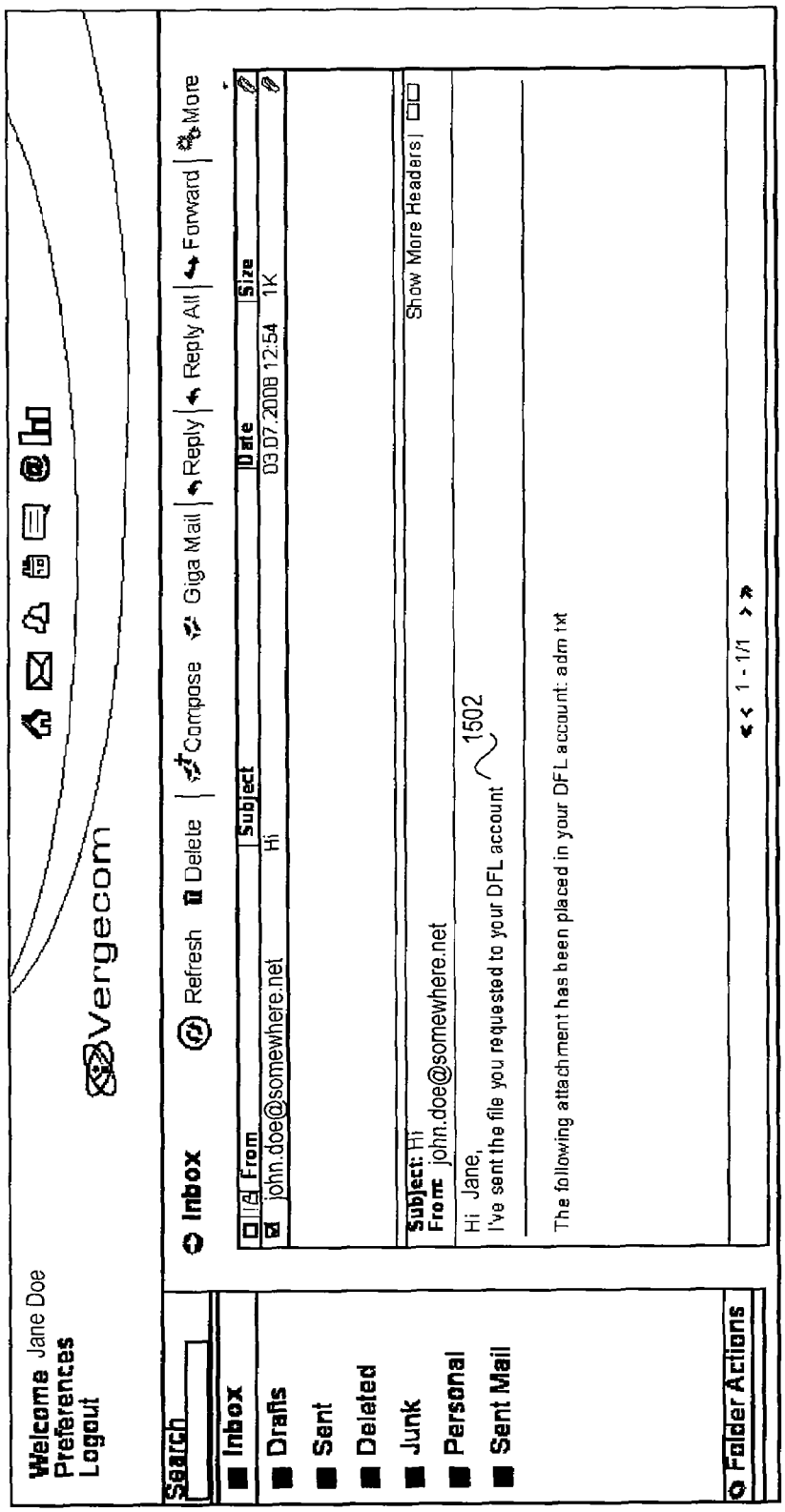
FIG. 15 shows a sender graphical user interface displaying an account denial indication.

When the messaging server 102 receives a confirmation of delivery, the messaging server 102 builds a notification message corresponding to the confirmation of delivery notifications. The notification message may be incorporated into a GUI and displayed to the intended recipient, such as the GUI 1500 of FIG. 15. The notification message may include information such as the file name, file size, sender name, or any other information that is useful to the intended recipient. The notification message is sent to a receiver device 204 without any attachments (268). Sending a notification message without attachments may use less bandwidth on an email server and/or take up less space in a recipient's hard drive or inbox than sending an email with an attachment. The notification message may include a personalized message, such as message 1502.

Figure 16:
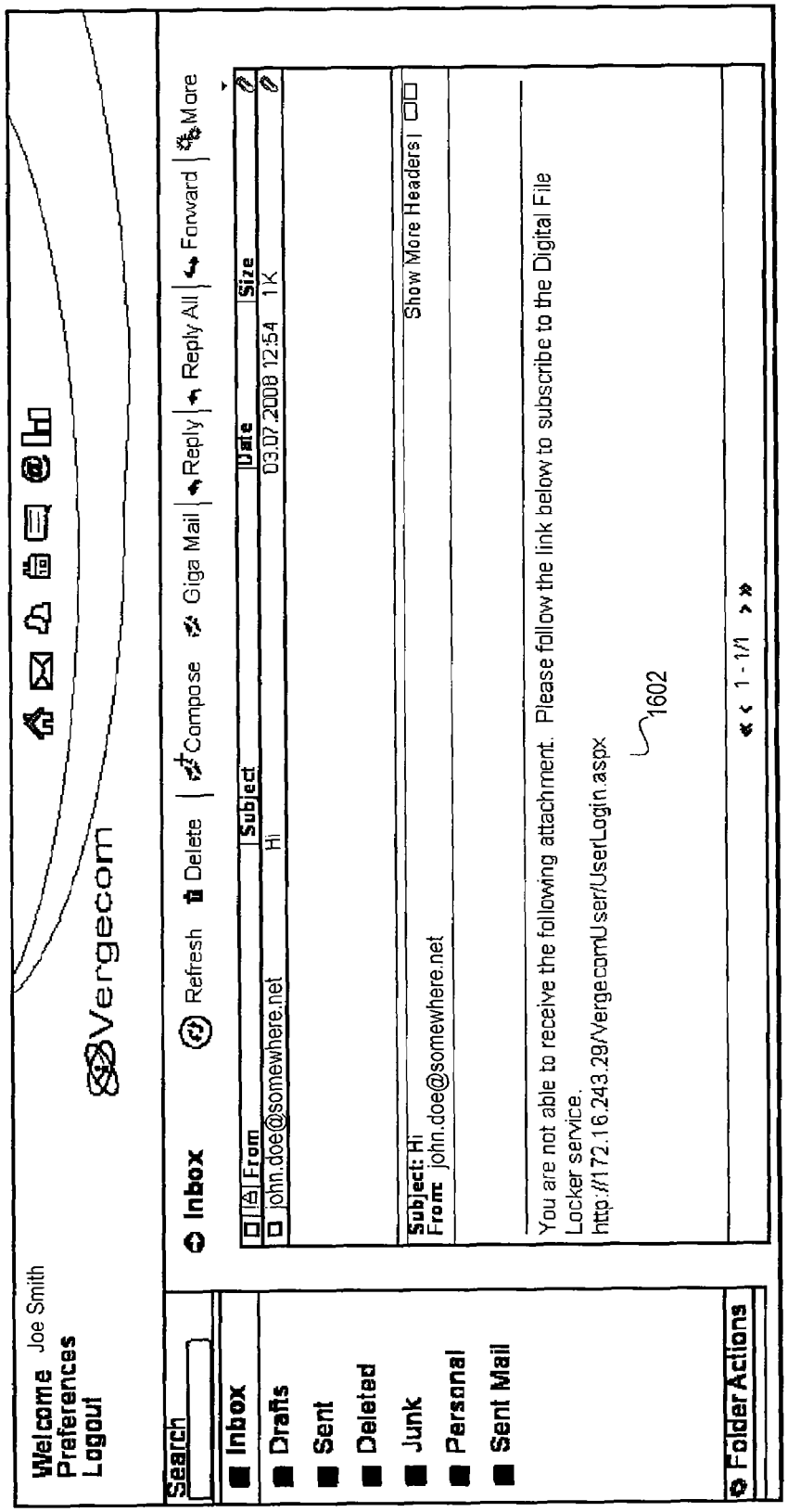
FIG. 16 shows a recipient graphical user interface where the recipient does not subscribe to the electronic file delivery service.
Figure 17:
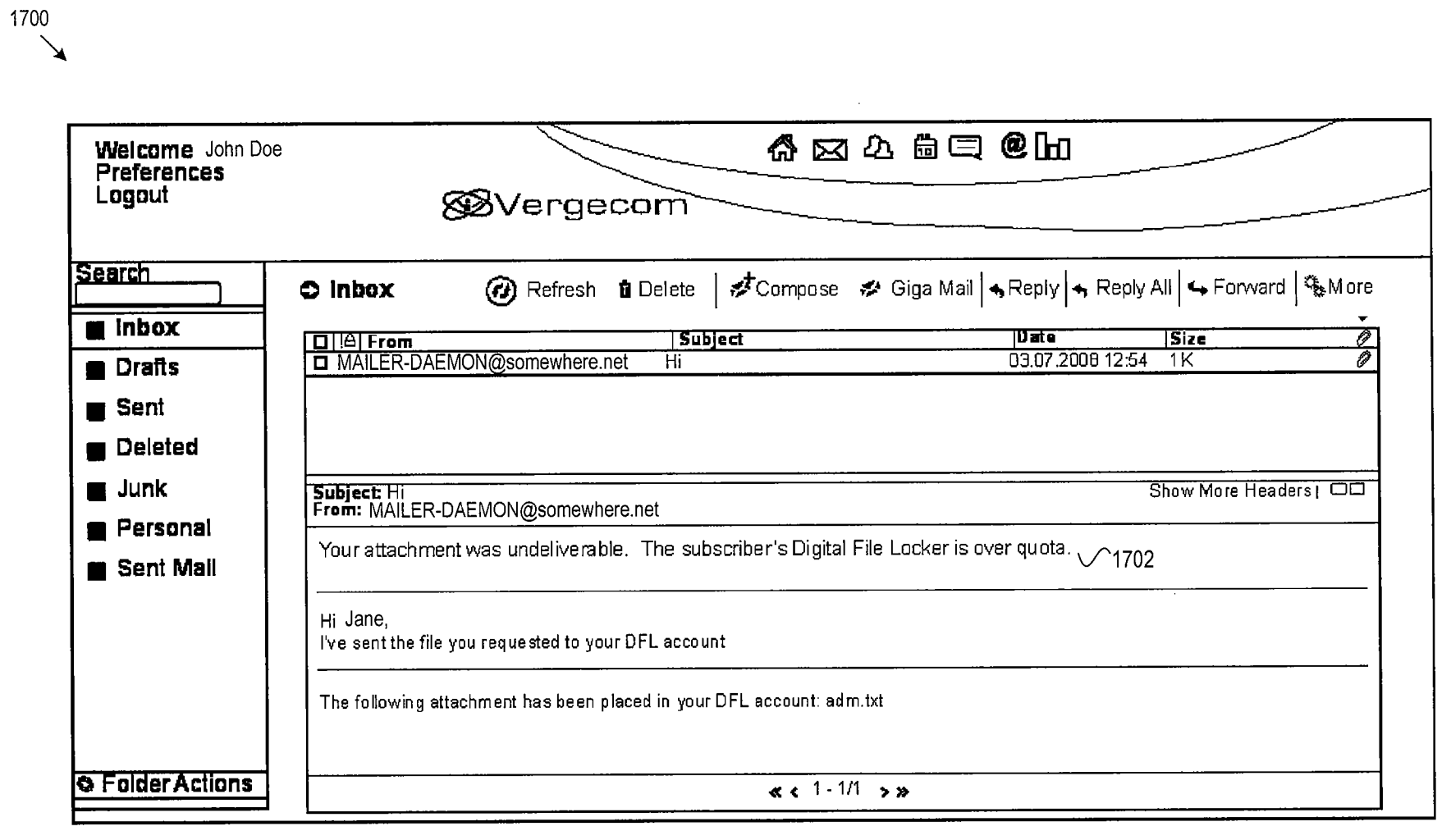

Alternatively or additionally, the messaging server 102 may build a notification message corresponding to the denial of delivery notifications. The notification message may be incorporated into a GUI and displayed to the intended recipient, such as the GUI 1600 of FIG. 16. The notification message may include an invitation to subscribe 1602. Where the denial of delivery may be due to system problems with the Service 104 and not because the intended recipient lacks an account with the service 104, the sender device may receive a message indicating the system problem. For example, the sender device may receive the system error message 1702 as presented on GUI 1700 in FIG. 17.

Where there are errors in the file delivery, the sender may select a recipient list, such as a subset of the original recipient list who did not receive one or more electronic files, and select one or more of the files that this recipient list failed to receive the first time. The sender device 202 sends to the messaging server 102 this recipient list and the files (270). The messaging server 102 may send to the receiving device 204 the file as an attachment to an email through an email server (272). The receiving device 204 may confirm or deny to the messaging server 102 that the message was delivered (274). The messaging server 102 may build a GUI based on the confirmation or denial and send to the sender device 202 the GUI (276).

Figure 3:
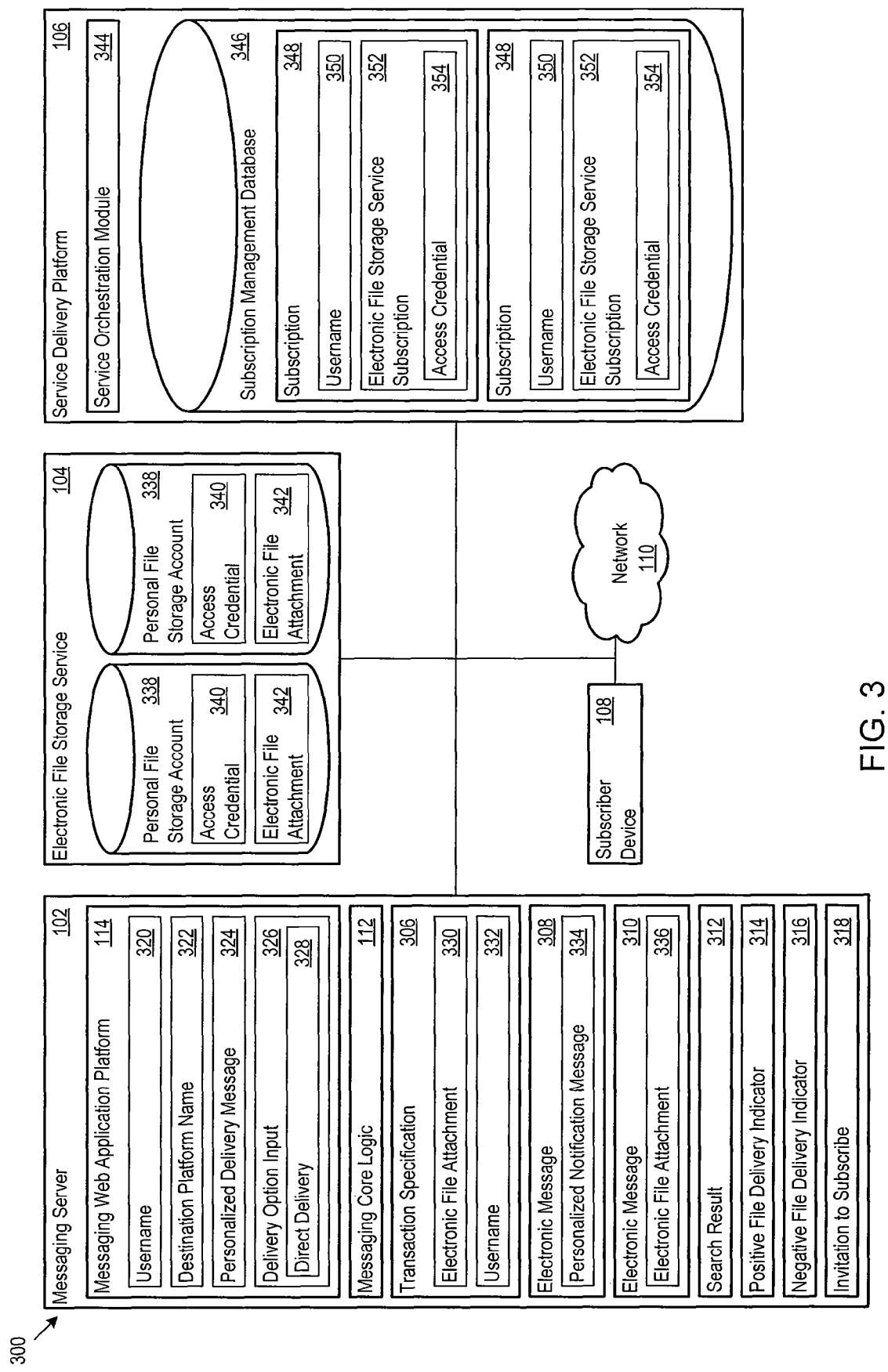
FIG. 3 shows electronic file delivery architecture.

FIG. 3 shows electronic file delivery architecture 300. The electronic file delivery architecture 300 includes the messaging server 102, the Service 104, the SDP 106, the subscriber device 108, and the network 110. The messaging server 102 includes the web platform 114, messaging core logic 112, a transaction specification 306, electronic messages 308 and 310, a search result 312, file delivery indicators 314 and 316, and an invitation to subscribe 318. The web platform 114 includes username 320, destination platform name 322, a personalized delivery message 324, and a delivery option input 326. The username 320, destination platform name 322, personalized delivery message 324, and delivery option input 326 may be data received from the subscriber device 108 in response to a subscriber's input. The delivery option input 326 may include an input for direct delivery 328.

The messaging core logic 112 receives, sends, and stores the transaction specification 306, the electronic messages 308 and 310, the search result 312, the file delivery indicators 314 and 316, and the invitation to subscribe 318. The messaging core logic 112 may receive the transaction specification 306 from the web platform 114. The transaction specification 306 includes a file 330 and a username 332. The messaging core logic 112 may create the electronic message 308 when the file 330 has been successfully uploaded to the Service 104. The electronic message 308 may include a personalized notification message 334 created by a sender on a subscriber device 108. Alternatively, the electronic message 308 may include a standard, pre-determined notification message, alert, tone or other notification.

The messaging core logic 112 may create the electronic message 310 when an intended recipient does not have a personal account with the Service 104. The electronic message 310 includes the electronic file attachment 336. The messaging core logic 112 may send the electronic message 310 with the file 336 to an intended recipient through an email server.

The messaging core logic 112 may receive the search result 312 from the SDP 106. The search result 312 may indicate whether an intended recipient has a personal file storage account with the Service 104. The messaging core logic 112 may receive the file delivery indicators 314 and 316 from the receiver device 204, the Service 104, or the SDP 106. The positive file delivery indicator 314 may indicate that a file has been successfully delivered. The negative file delivery indicator 316 may indicate that a file has not been successfully delivered.

The messaging core logic 112 may create the invitation to subscribe 318. The invitation to subscribe 318 may include text indicating that the intended recipient does not have a personal account with the electronic file storage service 104. The invitation to subscribe 318 may also include a hyperlink, such as a Uniform Resource Locator (URL), from which a user may access a webpage where they may register for such a personal account.

The Service 104 provides mass storage and rapid data delivery for subscribers to the service. Each subscriber may have one or multiple personal file storage accounts 338 ("personal accounts 338") with the Service 104. Each personal account 338 has an access credential 340 which restricts access to the account. The access credential 340 may be a password or keystroke combination, or the access credential 340 may be a username or email address. Access to the personal account 338 may be limited to those supplying information matching the access credential 340. The personal account 338 may receive and store a file 342 from the messaging server 102 or the network 110.

The SDP 106 includes a service orchestration module 344 and a subscription management database 346 ("SMD 346"). The service orchestration module 344 coordinates multiple implementation services into a single, aggregate service. For example, the service orchestration module coordinates communication between the messaging server 102 and the SMD 346.

The SMD 346 stores and retrieves subscriber information for subscribers to the services provided by the SDP 106. The subscriber information may be stored as SDP subscriptions 348 within the SMD 346. Each SDP subscription 348 may include a username 350 and an electronic file storage service subscription 352 ("Service subscription 352"). The username 350 provides identification of the account and identification of the SDP subscriber. The Service subscription 352 indicates that the SDP subscriber has a personal account 338 on the Service 104. The Service subscription 352 may include an access credential 354, which, when matched to an access credential 340 of a personal account 338, may provide access to the personal account 338.

Figure 4:
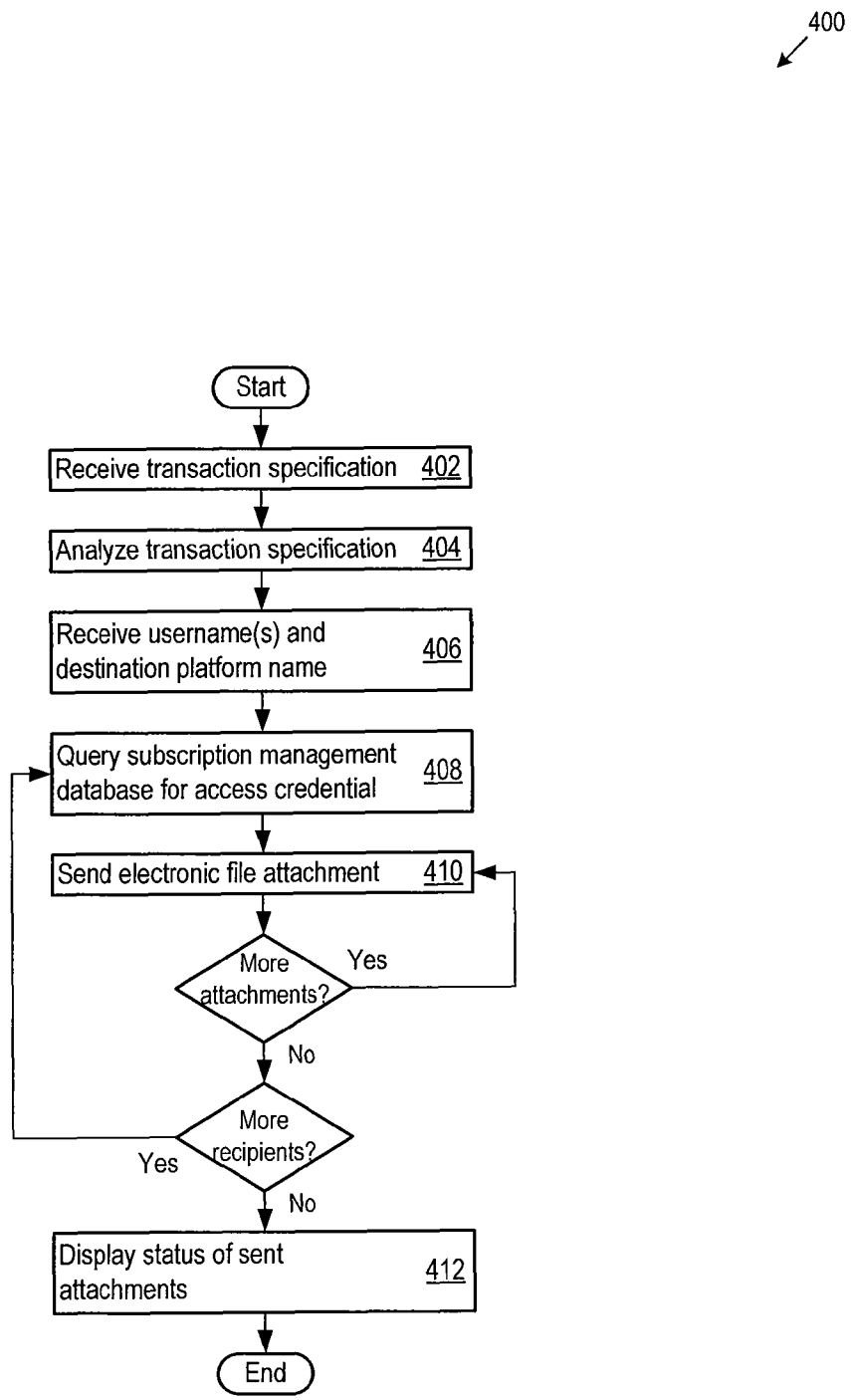
FIG. 4 shows an electronic file delivery flow.

FIG. 4 shows a flow 400 for electronic file delivery. The flow 400 may be realized in the context of the electronic file delivery architecture 300. The messaging server 102 receives a transaction specification 306 through the web platform 114 (402). The web platform 114 or messaging core logic 112 analyzes the transaction specification 306 (404). The analysis may include parsing the transaction specification 306 and determining whether the intended transaction is to be conducted with the Service 104. The analysis may include determining whether the intended transaction is to include sending a file through an email server to an intended recipient.

The messaging server 102 receives one or more usernames 320 and a destination platform name 322 through the web platform 114 (406). The web platform 114 may communicate the username 320 and the destination platform name 322 to the messaging core logic 112. The messaging core logic 112 initiates processes to query the SMD 346 for an access credential 354 (408). The query may be routed through the network 110 and/or the service orchestration module 344 of the SDP 106. The query may occur according to message transactions 252 and 254.

The messaging core logic 112 sends the file 330 according to a process indicated in the delivery option input 326 and/or the information in the transaction specification 306 and the search result 312 (410). For example, where the delivery option input 326 indicates file delivery to the Service 104 and the intended recipient has a personal account 338 with the Service 104, then the messaging core logic 112 initiates processes to transfer the file 330 to the personal account 338. Where the delivery option input 326 indicates direct delivery 328, then the messaging core logic 112 initiates processes to send the file 330 through an email server.

If more than one attachment is to be sent to an intended recipient, then those attachments are also sent to that intended recipient. If more than one intended recipient has been indicated, then the messaging core logic 112 queries the SMD 346 for the next intended recipient's access credentials.

The sender device 202 displays the delivery status of the sent attachments (412). The delivery status may reflect the positive file delivery indicator 314 and/or the negative file delivery indicator 316. The display may include a delivery status for individual file attachments, for individual intended recipients, or a combination of the two.

Figure 5:
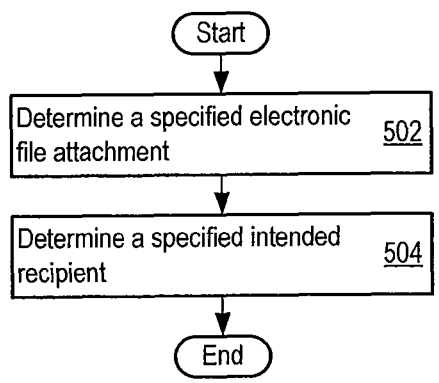
FIG. 5 shows a transaction specification analysis flow.

FIG. 5 shows a flow 500 for a transaction specification analysis, such as the analysis referenced above at (404). The web platform 114 and/or the messaging core logic 112 determine a specified file (502). The web platform 114 and/or the messaging core logic 112 determine a specified intended recipient (504). Either determination may occur by parsing the transaction specification 306. For example, an identifier for a specified file and an identifier for a specified intended recipient may be separated from and/or located within known fields from a communication from the sender device 202. Alternatively, the location of the specified file and/or an identifier for the specified intended recipient may be passed to the web platform 114 and/or the messaging core logic 112 as variables.

Figure 6:
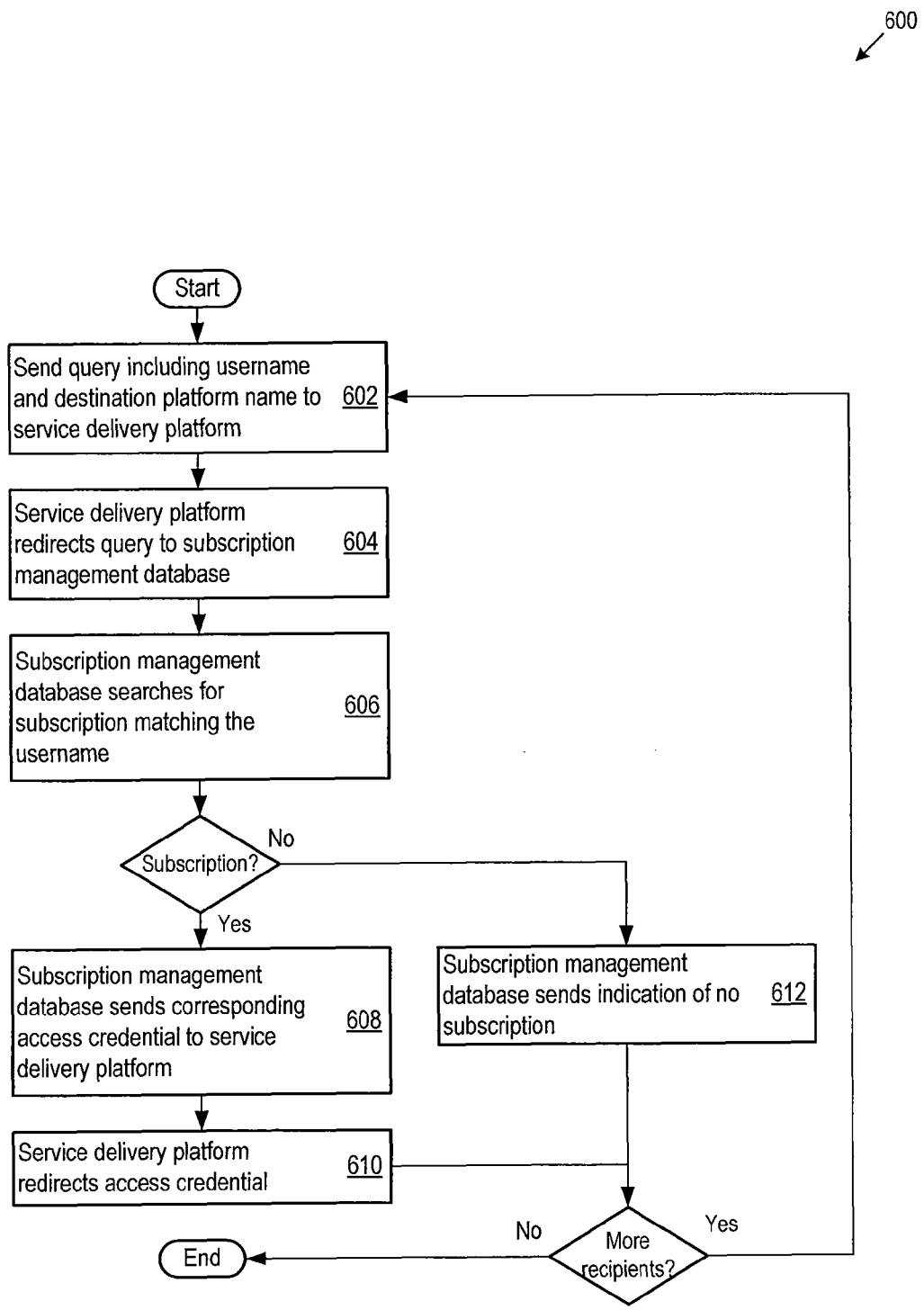
FIG. 6 shows a subscription management database query flow.

FIG. 6 shows a flow 600 for a subscription management database query, such as the query referenced above at (408). The messaging core logic 112 sends a query including one or more usernames 320 and a destination platform name 322 to the SDP 106 (602). This query may be sent directly or through the network 110. The query may be received by the service orchestration module 344 within the SDP 106.

The SDP 106 receives the query and redirects it to the SMD 346 (604). The redirection may include reformatting or translating the query into one which the SMD 346 can process. The SMD 346 searches for a SDP subscription 348 with a username 350 that matches the username 320 from the query (606).

Where a SDP subscription 348 exists with a username 350 matching the username 320, the SMD 346 determines whether the subscription SDP 348 has a Service subscription 352. Where both conditions are met, the SMD 346 sends the access credential 354 to the SDP 106 (608). The SDP 106 redirects the access credential 354 to the messaging server 102 (610). Otherwise, the SMD 346 sends an indication that no SDP subscription or Service subscription exists for the username (612). The flow 600 may be repeated where more than one intended recipient is specified.

Figure 7:
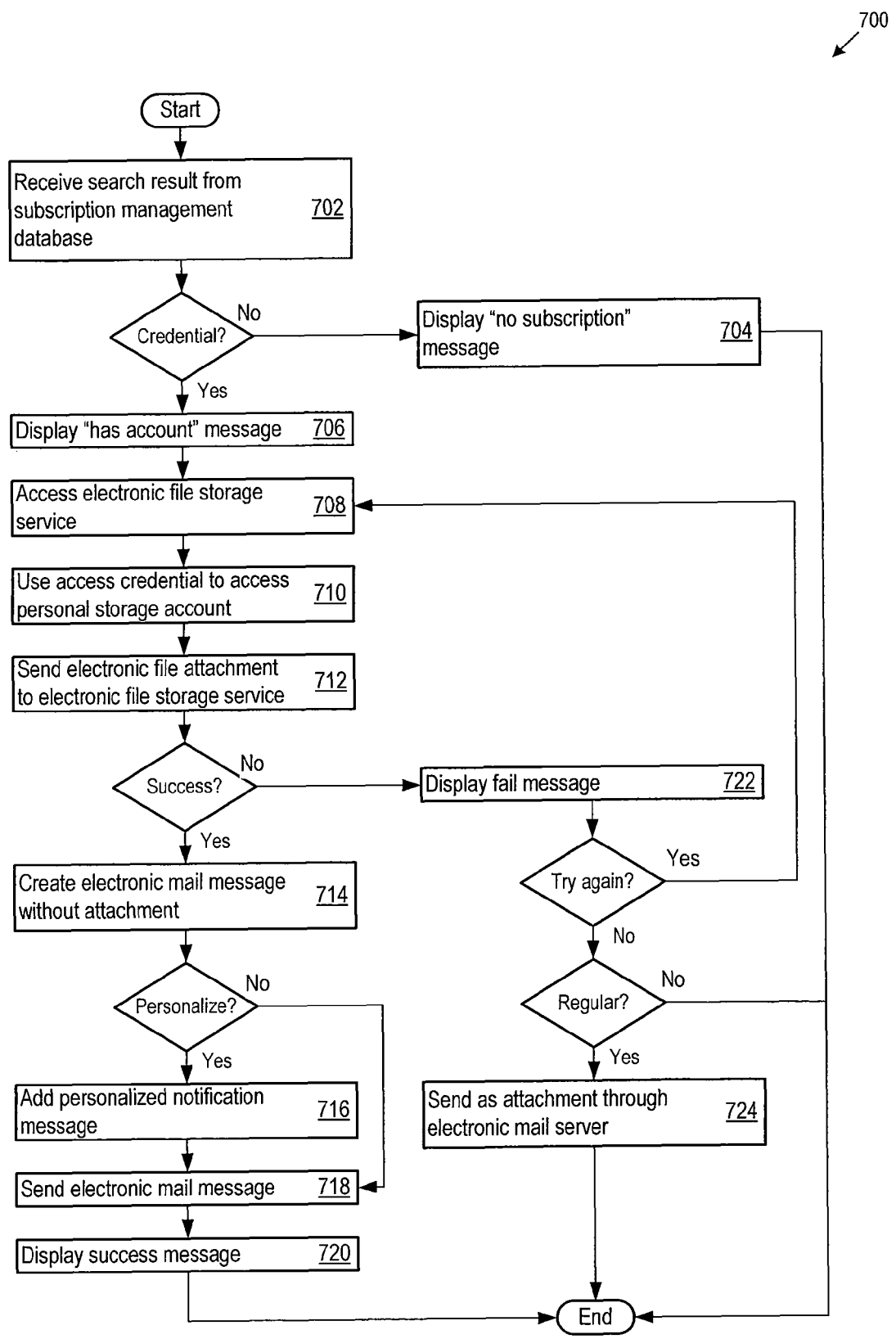
FIG. 7 shows an electronic file sending flow.

FIG. 7 shows a flow 700 for an electronic file sending, such as the sending referenced above at (410). The messaging server 102 receives the search result 312 from the SMD 346 (702). The messaging core logic 112 determines whether the search result 312 includes an access credential 354 or other indication that the intended recipient has a Service subscription 352. Where no access credential 354 is returned or where there is indication that the intended recipient does not have a Service subscription 352, the web platform 114 sends a GUI to the sender device 202 which displays an indication that the intended recipient does not have a Service subscription 352 (704). Where the search result 312 includes an access credential 354 or where there is indication that the intended recipient has a Service subscription 352, the web platform 114 sends a GUI to the sender device 202 which displays an indication that the intended recipient has a Service subscription 352 (706).

The messaging core logic 112 initiates a communication link with the Service 104 to access the Service 104 (708). The messaging core logic 112 in the messaging server 102 uses the access credential 354 to access the intended recipient's personal account 338 with the Service 104 (710). This access may be granted when the access credential 354 supplied by the messaging server 102 matches the access credential 340 for the personal account 338. The messaging core logic 112 in the messaging server 102 sends the file 330 to the Service 104, where it may be stored as the file 342 in the intended recipient's personal account 338 (712).

Where the file 342 has been successfully uploaded, the messaging core logic 112 creates an email message 308 without an attachment (714). The email message 308 may include a personalized delivery message 324, which may have been received by the web platform 114 from the sender device 202. The personalized delivery message 324 may be added to the email message 308 as the personalized notification message 334 (716).

The messaging core logic 112 initiates processes to send the email message 308 to the intended recipient through an email server without the file (718). The messaging core logic 112 creates a positive file delivery indicator 314 to represent the successful transfer of the file 342 to the intended recipient's personal account 338. The messaging core logic 112 and/or the web platform 114 build the positive file delivery indicator 314 into a GUI, which is sent to the sender device 202. The sender device 202 displays the GUI as a "successful delivery" message (720).

Where the file 342 is not successfully stored in the intended recipient's personal account 338, the messaging core logic 112 creates a negative file delivery indicator 316 to represent the unsuccessful transfer of the file 330 to the intended recipient's personal account 338. The messaging core logic 112 and/or the web platform 114 builds the negative file delivery indicator 316 into a GUI, which is sent to the sender device 202. The sender device 202 displays the GUI as a "fail" or "unsuccessful delivery" message (722). The GUI may provide the sender with the option of trying again to deliver the file to the intended recipient's personal account and/or to attempt to deliver the file through an email server. Where the sender opts to deliver through the email server, the messaging core logic 112 creates an electronic message 310 including the file 330 as file 336. The messaging core logic 112 initiates processes to send the email message 310 with the file 336 through an email server (724).

Figure 8:
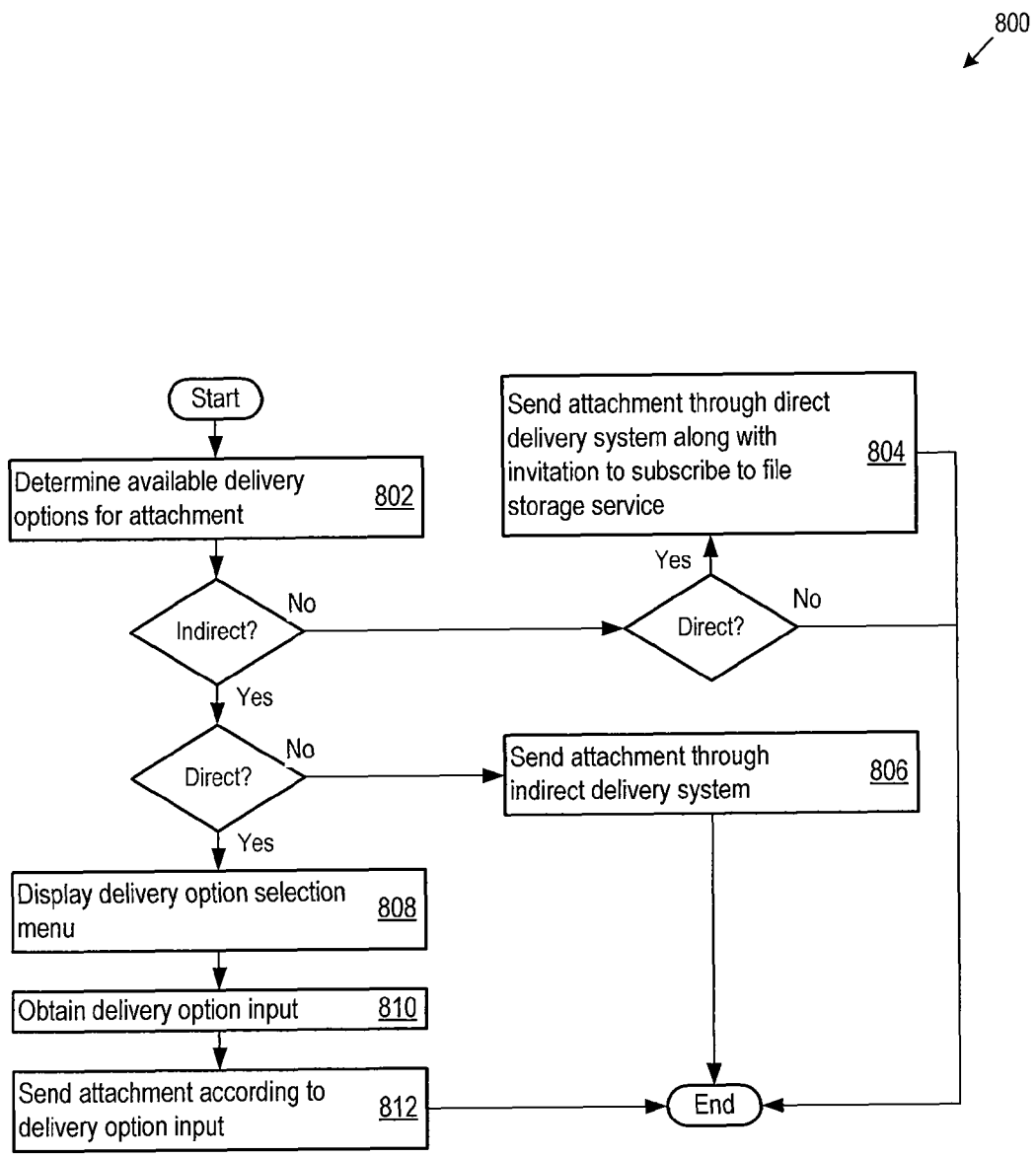
FIG. 8 shows an electronic file sending flow with delivery options.

FIG. 8 shows a flow 800 for electronic file sending with delivery options. The flow 800 may be realized in the context of the electronic file delivery architecture 300. The messaging core logic 112 determines the available delivery options for the file (802). The determination may be performed by querying the SDP 106 for the available options. Alternatively or additionally, the determination may be made by polling the available systems directly connected to the messaging server 102 or on the network 110. For example, the messaging core logic 112 may query the SDP 106 about the file delivery services available, and the SDP 106 may respond with a list including an email server, a DFL, and a Web 2.0 repository. The determination may include whether an indirect or direct delivery option is available. For example, the availability of a DFL or Web 2.0 repository would provide an indirect delivery option, while the availability of an email server provides a direct delivery option.

Where neither an indirect nor direct delivery option is available, the file is undeliverable. Where an indirect option is unavailable, but a direct delivery option is available, the messaging core logic 112 sends the file 330 through the direct delivery system along with an invitation to subscribe to the indirect delivery service 318 (804). Where an indirect delivery option is available, but a direct delivery option is not available, the messaging core logic 112 sends the file 330 through the indirect delivery system (806).

Where both direct and indirect delivery options are available, the messaging core logic 112 and/or the web platform 114 builds a GUI including a delivery option selection menu and sends the GUI to the sender device 202. The sender device 202 displays the GUI with the delivery option selection menu to the sender (808). The sender may select a delivery option 326 from the selection menu, and that delivery option 326 is obtained by the messaging core logic 112 and/or the web platform 114 (810). The messaging core logic 112 initiates processes to send the file 330 according to the selected delivery option input 326 (812). For example, the sender may select the DFL as an indirect delivery option, and the messaging core logic 112 uploads the file 330 to an intended recipient's personal account with the DFL.

Figure 9:
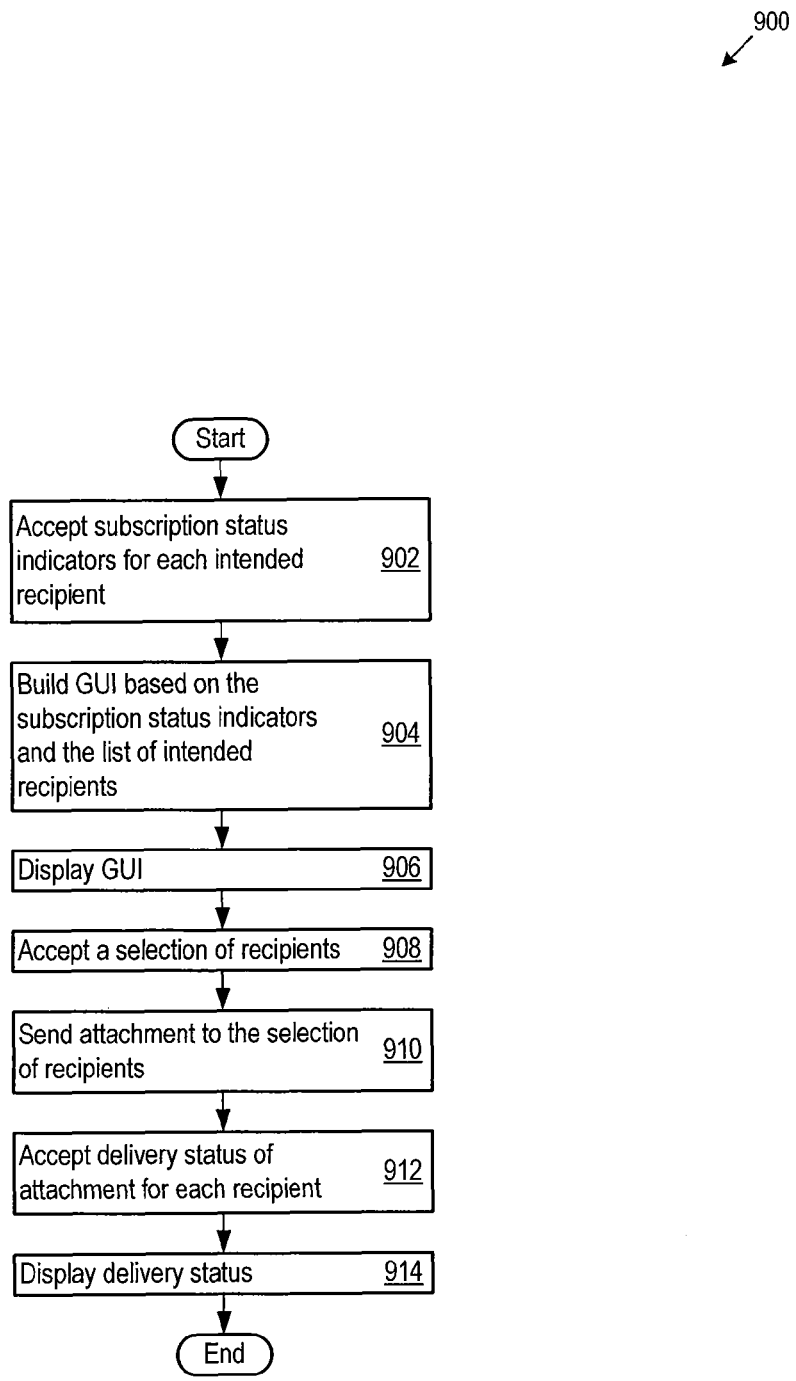
FIG. 9 shows an attachment delivery status display flow.

FIG. 9 shows a flow 900 for displaying an attachment delivery status. The flow 900 may be realized in the context of the electronic file delivery architecture 300. The messaging core logic 112 queries the SMD 346 for the access credentials 354 for each intended recipient. The messaging core logic 112 accepts subscription status indicators for each intended recipient from the SMD 346 (902). The subscription status indicators may be routed through the service orchestration module 344. The subscription status indicators may be stored as the search result 312.

The messaging core logic 112 and/or the web platform 114 builds a GUI based on the subscription status indicators and the list of intended recipients (904). For example, the GUI may include email addresses for the intended recipients who have the Service subscription 352, and a pop-up error message for the intended recipients who do not have the Service subscription 352. Alternatively, the GUI may include a dialogue box with green status indicators next to the contact names for the intended recipients who have the Service subscription 352 and red status indicators next to those who do not. Many other variations for the GUI may be implemented that convey which intended recipients subscribe to the Service. The web platform 114 sends the GUI to the sender device 202, which displays the GUI to the sender (906).

The sender selects a second set of intended recipients from the GUI. The second set may be a subset of the original set of intended recipients. For example, the sender may select the intended recipients who have the Service subscription 352. The selection of intended recipients is accepted by the web platform 114 and/or the messaging core logic 112 (908).

The messaging core logic 112 sends the file 330 to the selection of recipients (910). The file 330 may be sent directly or indirectly to the selection of recipients. The messaging core logic 112 accepts a delivery status for each attachment for each intended recipient (912). The delivery status may be a positive file delivery indicator 314 or a negative file delivery indicator 316. The messaging core logic 112 and/or the web platform 114 builds a GUI incorporating the delivery status and send the GUI to the sender device 202. The sender device 202 displays the GUI with the delivery status (914).

Figure 10:
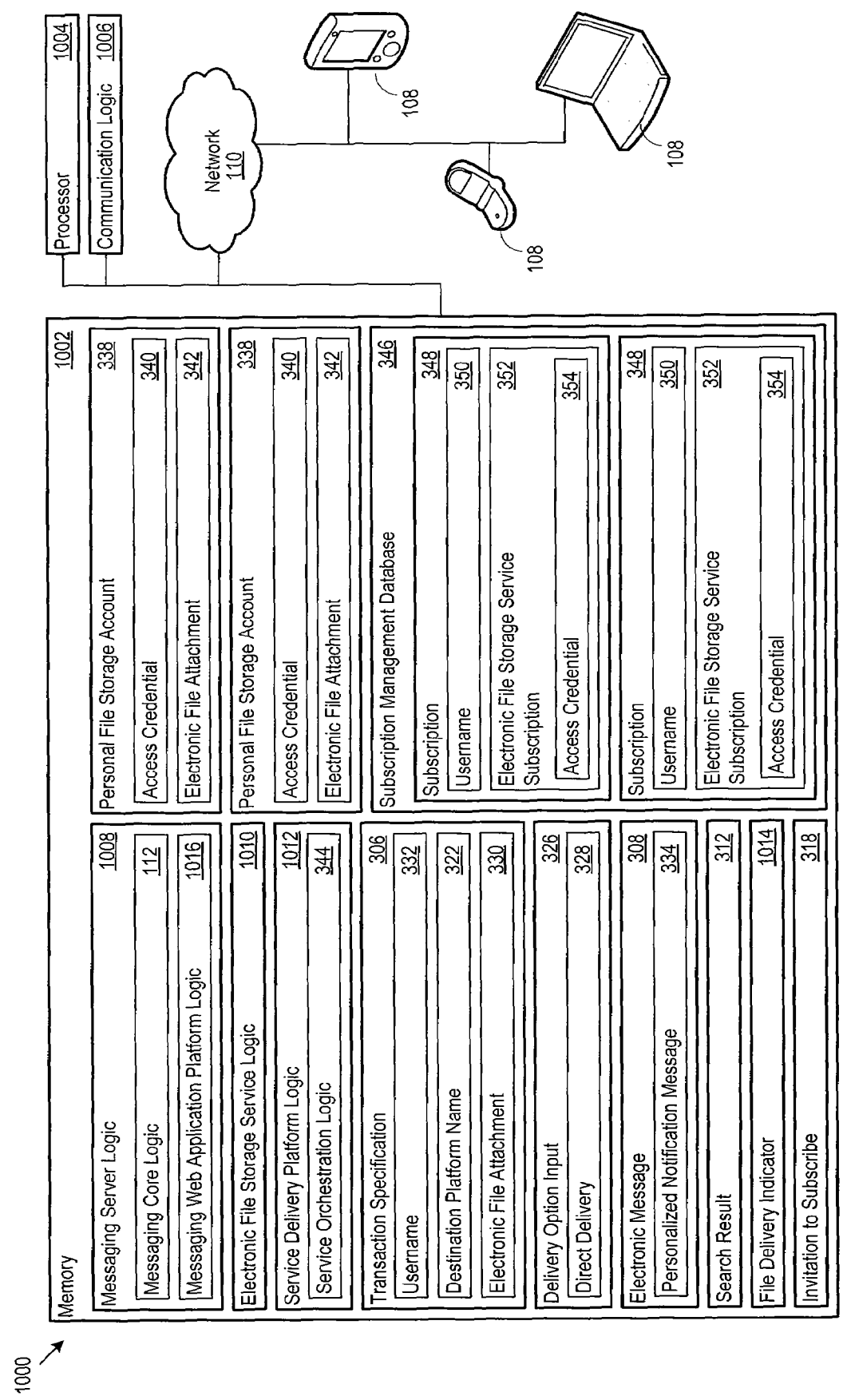
FIG. 10 shows alternative electronic file delivery architecture.

FIG. 10 shows alternative electronic file delivery architecture 1000. The alternative electronic file delivery architecture 1000 includes a memory 1002, a processor 1004, communication logic 1006, the network 110, and subscriber devices 108. The memory 1002 includes messaging server logic 1008, electronic file storage service logic 1010, SDP logic 1012, transaction specification 306, delivery option input 326, electronic message 308, search result 312, file delivery indicator 1014, invitation to subscribe 318, personal accounts 338, and SMD 346.

The messaging server logic 1008 includes messaging core logic 112 and messaging web platform logic ("web platform logic") 1016. The messaging server logic 1008 may perform the same functions as the messaging server 102. The web platform logic 1016 facilitates information exchange between the messaging core logic 112 and the subscriber devices 108. The web platform logic 1016 may perform the same functions as the web platform 114. The electronic file storage service logic ("Service logic") 1010 facilitates information exchange with the personal accounts 338. The Service logic 1010 may perform the same functions as the Service 104. The service delivery platform logic ("SDP logic") 1012 includes service orchestration logic 334. The SDP logic 1012 may perform the same functions as the SDP 106. The transaction specification 306 includes username 332, destination platform name 322, and the file 330. The delivery option input 326 includes the direct delivery selection 328, but may have in place of or in addition to the direct delivery selection 328, an indirect delivery selection. The electronic message 308 includes the personalized notification message 334. The file delivery indicator 1014 may be the positive file delivery indicator 314 and/or the negative file delivery indicator 316.

The personal account 338 includes the access credential 340 and the file 342. The SMD 346 includes subscriptions 348. Each subscription 348 includes the username 350 and the Service subscription 352. Each Service subscription 352 includes the access credential 354.

The system and methods presented above deliver files to a recipient's personal account without burdening an email server or the recipient's inbox with the file. The file is instead stored with a service dedicated to file storage, thereby providing an environment with dedicated resources for the file's management. The email server and recipient's inbox are freed up for handling incoming and outgoing messages rather than files.

The systems and hardware platforms described above may be implemented in many different ways. The functionality may be implemented in a single system or functionally partitioned across multiple systems. As another example, logic implemented as computer-executable instructions or as data structures in memory may be stored on, distributed across, or read from many different types of machine-readable media. The machine-readable media may include a tangible signal, such as a signal received from a network or partitioned into sections and received in multiple packets communicated across a network, and/or tangible computer-readable memory such as RAM, ROM, hard disks, floppy disks, CD-ROMs, flash memory, and optical/magnetic storage devices. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

Examples of protocols that the systems and hardware platforms may employ include the Real Time Messaging Protocol (RTMP) and Real Time Streaming Protocol (RTSP). The FLV (Flash Video) format may be employed for the media streams, and the systems may include Adobe™ Flash Media Streaming Server software, available from Adobe System Incorporated of San Jose, Calif. As other examples, the systems may include a Flash Lite™ server, QuickTime™ streaming server, or Darwin open-source server.

However, any other protocols for communicating audio, video, and data over a network between a server and an endpoint may be employed. The transport layer may include Transport Control Protocol (TCP), Real Time Transport Protocol (RTP) or other transport logic. The network layer may route information based on Internet Protocol v4, v6 (i.e., IPv4 or IPv6) or other network layer protocols. The data link layer may include wired or wireless links, such as IEEE 802.11, WiFi, WiMAX, Asynchronous Transfer Mode (ATM), Fiber Distributed Data Interface (FDDI), Ethernet, or other data link layers over optical fiber, coaxial cable, twisted pair or other physical layers.

Interfaces between the systems and the logic and modules within systems may be implemented in numerous ways. For example, interface between systems may be Web Services interfaces. Other examples of interfaces include message passing, such as publish/subscribe messaging, shared memory, and remote procedure calls.

The hardware and software platforms that run on the endpoints may vary widely. As examples, the endpoints may run the Windows CE™ operating system, JAVA ME™ system, Symbian™ operating system, Palm™ operating system. The hardware platforms may be implemented with a general purpose processing platform, such as those available from Sun Microsystems, Hewlett Packard, or International Business Machines and running Unix, Windows™, Linux or other operating systems.

While various embodiments of the electronic file delivery system have been described, it will be apparent to those of ordinary skill in the art that many more embodiments and implementations are possible within the scope of the invention. Accordingly, the invention is not to be restricted except in light of the attached claims and their equivalents.

According to another aspect, an electronic file delivery product is provided. The product may comprise: a memory; messaging web application logic stored in the memory and may be operable to receive: a username identifying an intended recipient of an electronic file attachment; and a destination platform name identifying an electronic file storage service on which the intended recipient has a personal file storage account; and messaging core logic stored in the memory and may be operable to: analyze a transaction specification to determine: the electronic file attachment; and the intended recipient of the electronic file attachment; query through a service delivery platform a subscription management database with the username and the destination platform name for an access credential that permits sending and storing of the electronic file attachment to the intended recipient's personal account; access the intended recipient's personal file storage account on the electronic file storage service; send the electronic file attachment to the electronic file storage service on which the intended recipient has the personal file storage account; create an electronic message to the intended recipient omitting the electronic file attachment and including a notification of the electronic file attachment stored in the personal file storage account; and send the electronic message without the electronic file attachment to the intended recipient.

In yet another aspect, the messaging core logic may be further operable to: query the subscription management database with the username and the destination platform name to determine whether the intended recipient has the personal file storage account on the electronic file storage service; and obtain a search result confirming that the intended recipient has the personal account on the electronic file storage service, and where the messaging web application platform may be further operable to display an account confirmation indicator that conveys that the intended recipient has the personal file storage account.

In yet another aspect, the electronic file attachment may be one of multiple electronic file attachments specified in the electronic message, and where the messaging core logic may be operable to send the electronic file attachment comprising: sending each of the multiple electronic file attachments to the electronic file storage service on which the intended recipient has the personal file storage account; receiving from the electronic file storage service a file delivery indicator for each of the multiple electronic file attachments, each file delivery indicator conveying whether its associated electronic file attachment was successfully stored in the intended recipient's personal file storage account; and analyzing each file delivery indicator and generating an electronic file storage delivery report display conveying whether each of the multiple electronic file attachments was successfully stored.

In yet another aspect, the messaging core logic may be further operable to determine available delivery options for the electronic file attachment, including: determining that an electronic file attachment redirection delivery option is available, in which the electronic file attachment is omitted from the electronic message sent to the intended recipient and delivered separately into the personal file storage account for the intended recipient; and determining that an electronic file attachment direct delivery option is available, in which the electronic file attachment is delivered with the electronic message, and where the messaging web application platform may be further operable to: display a delivery option selection menu comprising: a redirection delivery selector; an a direct delivery selector; and obtain a delivery option input that specifies a choice from the delivery option selection menu.

In yet another aspect, the messaging web application platform may obtain the delivery option input comprising receiving a direct delivery selection in response to displaying the delivery option selection menu, the messaging core logic may be further operable to send to the intended recipient an invitation to subscribe to the electronic file storage service.

In yet another aspect, the messaging core logic may be further operable to: query the subscription management database with a second username and the destination platform name to determine whether a second intended recipient has a personal file storage account on the electronic file storage service; and obtain a search result denying that the second intended recipient has a personal file storage account on the electronic file storage service; and where the messaging web application platform may be further operable to: display an account denial indicator that conveys that the second intended recipient does not have the personal file storage account; build a graphical user interface (GUI) with the account confirmation indicator and the account denial indicator; and display the GUI with the account confirmation indicator and the account denial indicator.

In yet another aspect, the messaging web application platform may display the GUI comprising displaying recipient selectors, the messaging web application platform may be further operable to: receive a recipient selection responsive to input received through the displayed recipient selectors; and send the recipient selection to the messaging core logic; and the messaging core logic may be further operable to send the electronic file attachment to intended recipients specified by the recipient selection.

What is claimed is:

1. A method for delivering an electronic file attachment comprising:
    analyzing a transaction specification to determine a specified:
        electronic file attachment; and
        intended recipient of the electronic file attachment;
    determining available delivery options for the electronic file attachment, including:
        determining that an electronic file attachment direct delivery option is available, in which the electronic file attachment is delivered with the electronic message; and
    determining that an electronic file attachment redirection delivery option is available, in which the electronic file attachment is omitted from the electronic message sent to the intended recipient and delivered separately into a personal file storage account for the intended recipient;
    displaying the available delivery options to a user;
    receiving a delivery option selection from among the available delivery options from the user; and
    when the delivery option selection comprises the electronic file attachment redirection delivery option:
        receiving at a messaging server:
            a username identifying the intended recipient, and
            a destination platform name identifying an electronic file storage service on which the intended recipient has the personal file storage account;
        querying a subscription management database with the username and the destination platform name for an access credential that permits sending and storing of the electronic file attachment to the personal file storage account;
        accessing from the messaging server the personal file storage account on the electronic file storage service;
        sending the electronic file attachment from the messaging server to the electronic file storage service on which the intended recipient has the personal file storage account;
        creating an electronic message to the intended recipient omitting the electronic file attachment and including a notification of the electronic file attachment stored in the personal file storage account; and
        sending the electronic message without the electronic file attachment to the intended recipient.

2. The method of claim 1 further comprising:
    querying the subscription management database with the username and the destination platform name to determine whether the intended recipient has the personal file storage account on the electronic file storage service;
    obtaining a search result confirming that the intended recipient has the personal account on the electronic file storage service; and displaying an account confirmation indicator that conveys that the intended recipient has the personal file storage account.

3. The method of claim 1 where the electronic file attachment is one of multiple electronic file attachments specified in the electronic message, and where sending the electronic file attachment comprises:
sending each of the multiple electronic file attachments to the electronic file storage service on which the intended recipient has the personal file storage account;
receiving from the electronic file storage service a file delivery indicator for each of the multiple electronic file attachments, each file delivery indicator conveying whether its associated electronic file attachment was successfully stored in the intended recipient's personal file storage account; and
analyzing each file delivery indicator and generating an electronic file storage delivery report display conveying whether each of the multiple electronic file attachments was successfully stored.

4. The method of claim 1, further comprising:
when the delivery option selection comprises the electronic file attachment direct delivery option, the method further comprising sending to the intended recipient an invitation to subscribe to the electronic file storage service.

5. The method of claim 2 further comprising:
querying the subscription management database with a second username and the destination platform name to determine whether a second intended recipient has a personal file storage account on the electronic file storage service;
obtaining a search result denying that the second intended recipient has a personal file storage account on the electronic file storage service;
displaying an account denial indicator that conveys that the second intended recipient does not have the personal file storage account;
building a graphical user interface (GUI) with the account confirmation indicator and the account denial indicator; and
displaying the GUI with the account confirmation indicator and the account denial indicator.

6. The method of claim 5 where displaying the GUI further comprises displaying recipient selectors, the method further comprising:
receiving a recipient selection responsive to input received through the displayed recipient selectors;
sending the recipient selection to messaging core logic within the messaging server; and
sending the electronic file attachment from the messaging server to intended recipients specified by the recipient selection.

7. An electronic file delivery system comprising:
a messaging server comprising:
a messaging web application platform operable to receive:
a username identifying an intended recipient of an electronic file attachment; and
a destination platform name identifying an electronic file storage service on which the intended recipient has a personal file storage account; and
messaging core logic operable to:
analyze a transaction specification to determine:
the electronic file attachment; and
the intended recipient of the electronic file attachment;
determine available delivery options for the electronic file attachment, including:
determining that an electronic file attachment redirection delivery option is available, in which the electronic file attachment is omitted from an electronic message sent to the intended recipient and delivered separately into the personal file storage account for the intended recipient; and
determining that an electronic file attachment direct delivery option is available, in which the electronic file attachment is delivered with the electronic message;
wherein the messaging web application platform is further operable to:
display the available delivery options to a user,
receive a delivery option selection from among the available delivery options from the user; and
when the delivery option selection comprises the electronic file attachment redirection delivery option, the messaging core logic is further operable to:
query through a service delivery platform a subscription management database with the username and the destination platform name for an access credential that permits sending and storing of the electronic file attachment to the personal file storage account,
access the intended recipient's personal file storage account on the electronic file storage service,
send the electronic file attachment to the electronic file storage service on which the intended recipient has the personal file storage account,
create the electronic message to the intended recipient omitting the electronic file attachment and including a notification of the electronic file attachment stored in the personal file storage account, and
send the electronic message without the electronic file attachment to the intended recipient.

8. The system of claim 7 where the messaging core logic is further operable to:
query the subscription management database with the username and the destination platform name to determine whether the intended recipient has the personal file storage account on the electronic file storage service; and
obtain a search result confirming that the intended recipient has the personal account on the electronic file storage service, and
where the messaging web application platform is further operable to display an account confirmation indicator that conveys that the intended recipient has the personal file storage account.

9. The system of claim 7 where the electronic file attachment is one of multiple electronic file attachments specified in the electronic message, and where the messaging core logic is operable to send the electronic file attachment comprising:
sending each of the multiple electronic file attachments to the electronic file storage service on which the intended recipient has the personal file storage account;
receiving from the electronic file storage service a file delivery indicator for each of the multiple electronic file attachments, each file delivery indicator conveying whether its associated electronic file attachment was successfully stored in the intended recipient's personal file storage account; and
analyzing each file delivery indicator and generating an electronic file storage delivery report display conveying whether each of the multiple electronic file attachments was successfully stored.

10. The system of claim 7 where when the delivery option selection comprises the electronic file attachment direct delivery option the messaging core logic is further operable to send to the intended recipient an invitation to subscribe to the electronic file storage service.

11. The system of claim 8 where the messaging core logic is further operable to:
query the subscription management database with a second username and the destination platform name to determine whether a second intended recipient has a personal file storage account on the electronic file storage service; and
obtain a search result denying that the second intended recipient has a personal file storage account on the electronic file storage service; and
where the messaging web application platform is further operable to:
display an account denial indicator that conveys that the second intended recipient does not have the personal file storage account;
build a graphical user interface (GUI) with the account confirmation indicator and the account denial indicator; and
display the GUI with the account confirmation indicator and the account denial indicator.

12. The system of claim 11 where the messaging web application platform displays the GUI comprising displaying recipient selectors, the messaging web application platform further operable to:
receive a recipient selection responsive to input received through the displayed recipient selectors; and
send the recipient selection to the messaging core logic; and
the messaging core logic further operable to send the electronic file attachment to intended recipients specified by the recipient selection.

13. An electronic file delivery product comprising:
a memory;
messaging web application logic stored in the memory and operable to receive:
a username identifying an intended recipient of an electronic file attachment; and
a destination platform name identifying an electronic file storage service on which the intended recipient has a personal file storage account; and
messaging core logic stored in the memory and operable to:
analyze a transaction specification to determine:
the electronic file attachment; and
the intended recipient of the electronic file attachment;
determine available delivery options for the electronic file attachment, including:
determining that an electronic file attachment redirection delivery option is available, in which the electronic file attachment is omitted from an electronic message sent to the intended recipient and delivered separately into the personal file storage account for the intended recipient; and
determining that an electronic file attachment direct delivery option is available, in which the electronic file attachment is delivered with the electronic message;
wherein the messaging web application logic is further operable to:
display the available delivery options to a user,
receive a delivery option selection from among the available delivery options from the user; and
when the delivery option selection comprises the electronic file attachment redirection delivery option, the messaging core logic is further operable to:
query through a service delivery platform a subscription management database with the username and the destination platform name for an access credential that permits sending and storing of the electronic file attachment to the personal file storage account,
access the intended recipient's personal file storage account on the electronic file storage service,
send the electronic file attachment to the electronic file storage service on which the intended recipient has the personal file storage account,
create the electronic message to the intended recipient omitting the electronic file attachment and including a notification of the electronic file attachment stored in the personal file storage account, and
send the electronic message without the electronic file attachment to the intended recipient.

14. The product of claim 13 where the messaging core logic is further operable to:
query the subscription management database with the username and the destination platform name to determine whether the intended recipient has the personal file storage account on the electronic file storage service; and
obtain a search result confirming that the intended recipient has the personal account on the electronic file storage service, and
where the messaging web application platform is further operable to display an account confirmation indicator that conveys that the intended recipient has the personal file storage account.

15. The product of claim 13 where the electronic file attachment is one of multiple electronic file attachments specified in the electronic message, and
where the messaging core logic is operable to send the electronic file attachment comprising:
sending each of the multiple electronic file attachments to the electronic file storage service on which the intended recipient has the personal file storage account;
receiving from the electronic file storage service a file delivery indicator for each of the multiple electronic file attachments, each file delivery indicator conveying whether its associated electronic file attachment was successfully stored in the intended recipient's personal file storage account; and
analyzing each file delivery indicator and generating an electronic file storage delivery report display conveying whether each of the multiple electronic file attachments was successfully stored.

16. The product of claim 13 where when the delivery option selection comprises the electronic file attachment direct delivery option, the messaging core logic is further operable to send to the intended recipient an invitation to subscribe to the electronic file storage service.

17. The product of claim 14 where the messaging core logic is further operable to: query the subscription management database with a second username and the destination platform name to determine whether a second intended recipient has a personal file storage account on the electronic file storage service; and
obtain a search result denying that the second intended recipient has a personal file storage account on the electronic file storage service; and where the messaging web application platform is further operable to:
- display an account denial indicator that conveys that the second intended recipient does not have the personal file storage account;
- build a graphical user interface (GUI) with the account confirmation indicator and the account denial indicator; and
- display the GUI with the account confirmation indicator and the account denial indicator.

18. The product of claim 17 where the messaging web application platform displays the GUI comprising displaying recipient selectors, the messaging web application platform further operable to:
- receive a recipient selection responsive to input received through the displayed recipient selectors; and
- send the recipient selection to the messaging core logic; and the messaging core logic further operable to send the electronic file attachment to intended recipients specified by the recipient selection.

* * * * *

UNITED STATES PATENT AND TRADEMARK OFFICE
CERTIFICATE OF CORRECTION

| | | |
|---|---|---|
| PATENT NO. | : 8,019,822 B2 | Page 1 of 1 |
| APPLICATION NO. | : 12/272311 | |
| DATED | : September 13, 2011 | |
| INVENTOR(S) | : Laura Martino et al. | |

It is certified that error appears in the above-identified patent and that said Letters Patent is hereby corrected as shown below:

<u>In the Specification</u>

In column 4, line 55, before "(e.g. as" replace "en masse" with --*en masse*--.

In column 4, lines 56-57, after "may be returned" replace "en masse" with --*en masse*--.

<u>In the Claims</u>

In column 17, claim 10, line 3, immediately after "delivery option" insert --,--.

Signed and Sealed this
Seventh Day of February, 2012

David J. Kappos
*Director of the United States Patent and Trademark Office*